United States Patent

[11] 3,593,180

| [72] | Inventors | T. O. Paine, Administrator of the National Aeronautics and Space Administration with respect to an invention of Richard Bauer Kolbly, 26335 Community Blvd., Barstow, Calif. |
|---|---|---|
| [21] | Appl. No. | 880,248 |
| [22] | Filed | Nov. 26, 1969 |
| [45] | Patented | July 13, 1971 |

[54] SYSTEM FOR CONTROLLING THE OPERATION OF A VARIABLE SIGNAL DEVICE
7 Claims, 1 Drawing Fig.

[52] U.S. Cl. ............................................. 331/10, 331/7, 331/34, 331/66
[51] Int. Cl. ............................................. H03b 3/04
[50] Field of Search ............................................. 331/6, 10, 7, 18, 34, 66, 110, 141

[56] References Cited
OTHER REFERENCES
ELECTRONIC DESIGN, Aug. 31, 1964, pg. 64 331-2

ELECTRONIC DESIGN, Jul. 20, 1964, 2 pages 331-141 "Digital Oscillator"

*Primary Examiner*—John Kominski
*Attorneys*—J. H. Warden, Paul F. McCaul and G. T. McCoy

ABSTRACT: A system for controlling the operation of a variable signal generator is disclosed. The system includes an error generator which provides an output which varies as a function of the difference between the instantaneous output signal value of the variable signal generator and a reference signal value. A variable light source emits light of an intensity corresponding to the error signal level. An electrically isolated light dependent control signal generator including a photoresistive voltage divider is disposed in optical communication with the light source. The control signal generator provides signals to the control terminal of the variable signal generator to regulate its operation.

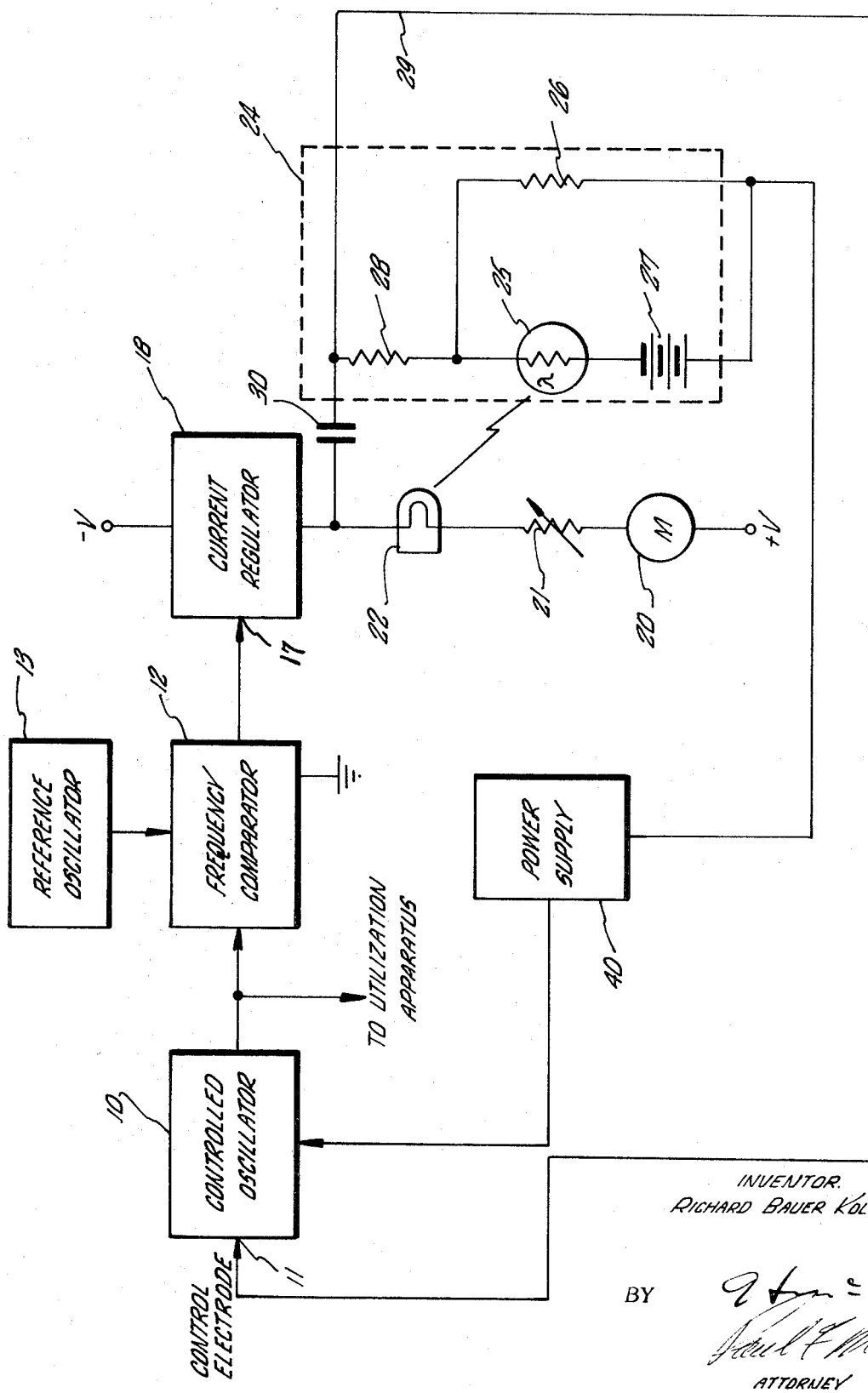

SYSTEM FOR CONTROLLING THE OPERATION OF A VARIABLE SIGNAL DEVICE

ORIGIN OF THE INVENTION

The invention described herein was made in the performance of work under a NASA contract and is subject to the provisions of Section 305 of the National Aeronautics and Space Act of 1958, Law 85-568 (72 Stat. 435; 42 USC 2457).

BACKGROUND OF THE INVENTION

1. Field of the Invention

The present invention relates to systems for controlling the operation of a variable signal device and more particularly to a system which utilizes an optical/capacitive coupling for isolating control voltages from error determining circuitry.

2. Description of the Prior Art

Feedback control systems for multipotential signal generators are known to the prior art. In certain variable multipotential signal generators there is a substantial potential gradient between a control electrode and system ground. Error feedback voltages are generally of a small magnitude in comparison with such a potential gradient. A particularly difficult problem is this posed in the design of feedback circuitry when attempting to apply a small error feedback voltage to a high potential of a variable signal generator.

A typical example of a multilevel generator to be controlled by an error feedback voltage is a reflex klystron. Such a klystron is usually operated with the body at ground potential and the reflector, or control electrode, at a control potential which is several hundred volts negative with respect to ground.

In many system applications, it is often necessary to stabilize or control such variable signal generators to assure a signal output accurately corresponding to a predetermined value.

If a direct application of the error signal is attempted, the potential at the control terminal often interferes with the operation of the error detection circuitry. To obviate this difficulty, elaborate precautions have heretofore been taken to electrically isolate the error detection circuitry from the high potential gradient at the control terminal of the variable signal generator.

To achieve the required isolation, various complex electronic isolation circuits have been devised. The use of such circuits, however, adversely affects the size, weight and reliability of the control systems. In addition, they greatly increase the cost of such systems.

OBJECTS AND SUMMARY OF THE INVENTION

In accordance with the present invention, a variable signal generator control system is provided which overcomes the above-noted difficulties without requiring complex isolation circuitry.

The system includes an error generator. The error generator provides an output which varies as a function of the difference between the instantaneous signal value of the variable signal generator and a reference signal value. In the illustrated embodiment, the variable signal generator is a reflex klystron having a control electrode at a potential far off ground potential. The error signal generator includes a reference oscillator and a comparator adapted to provide a DC error voltage corresponding to the difference between the reference frequency and the instantaneous klystron output frequency.

A variable light source emitting light of an intensity corresponding to the error signal is provided. A light dependent control signal generator is disposed in optical communication with the light source for generating a control signal which varies as a function of the light impinging thereon. In the embodiment described, the control signal generator includes a photoresistive voltage divider located near control electrode potential. The resistance of the photoresistor is controlled by the light source and is isolated electrically from the DC error circuit. A capacitive coupling is provided to transfer the AC components of the error signal to the control signal generating circuitry. The control signals thus generated are applied to the control terminal of the variable signal generator to regulate its operation.

The system thus described simply and economically controls the operation of a variable signal generator while providing the required isolation between the error determining and control signal generating circuitry.

It is, therefore, an object of this invention to provide an uncomplicated and inexpensive control system for controlling the operation of a variable signal generator.

It is another object of the present invention to provide a system for controlling the operation of a variable signal generator wherein an optical/capacitive coupling is provided between the error detection circuitry and the control signal generating circuitry to provide electrical isolation thereof.

It is a further object of the present invention to provide a control system for controlling the operation of a variable signal generator by the use of an error signal which is referenced to system ground where the control terminal of the generator is far off ground potential.

Still other objects, features and attendant advantages of the present invention will become apparent to those skilled in the art from a reading of the following description of a preferred embodiment constructed in accordance therewith, taken in conjunction with the accompanying drawing:

BRIEF DESCRIPTION OF THE DRAWING

The single FIGURE illustrates an exemplary control system, constructed in accordance with the principles of the present invention, for controlling the operating characteristics of an oscillator such as a reflex klystron.

DESCRIPTION OF THE PREFERRED EMBODIMENT

Referring now to the single FIGURE, there is shown an exemplary control system constructed in accordance with the principles of the present invention. The exemplary system of FIG. 1 is adapted to control the operation of an oscillator such as a reflex klystron 10 by supplying control signals to the control electrode 11 of the klystron. Typically, control electrode 11 is negative by at least several hundred volts with respect to system ground. Klystron 10 is, as shown, driven by a power supply 40.

A frequency comparator 12 receives the output of klystron 10 and the output of a reference oscillator 13. Frequency comparator 12 supplies a DC output corresponding to the difference between the reference oscillator frequency and the instantaneous klystron output frequency. As shown, the DC error signal is referenced to ground.

The error signal thus derived is applied to the control terminal 17 of a current regulator 18. Current regulator 18 provides a current therethrough as a function of the signal applied to its control terminal. Current regulator 18 is in series configuration with a current meter 20, a variable resistor 21 and a variable output light source 22.

Variable output light source or lamp 22 provides a light output, the intensity of which varies as a function of the current in the series path. As is apparent, the current in the series path, and therefore the intensity of light emitted by lamp 22, varies as a function of the error signal provided by frequency comparator 12. Meter 20 indicates lamp current and therefore acts as a physical error indicator. Variable resistor 21 is an adjusting resistor which allows the system to be properly tuned.

A control signal generator including a photoresistive voltage divider 24 generates the required control signals to be applied to control terminal 11. The voltage divider is maintained near the control electrode potential by power supply 40 via lead 41.

Voltage divider 24 comprises resistors 26 and 28, a battery 27, and a photoresistor 25. The photoresistor 25 is in optical communication with lamp 22. Increasing the current through lamp 22 decreases the resistance of the photoresistor causing the potential level on line 29 to vary.

The DC component of the lamp circuit is electrically isolated from the voltage divider circuit. A coupling capacitor 30 is, as shown, connected between the lamp circuit and the voltage divider circuit to transfer the AC or fast components of the error signal.

The system thus described is capable of simply and accurately controlling the frequency of operation of the control oscillator 10 without requiring complex isolation circuitry between the error detection circuitry and the control signal generating circuitry.

What I claim is:

1. A system for controlling the operation of a variable signal generator comprising:
   error signal generator means for providing an error signal which varies as a function of the difference between the instantaneous signal value of said variable signal generator and a reference signal value;
   variable light generating means for providing light emissions which vary in intensity as a function of said error signal;
   a light dependent control signal generator disposed in optical communication with said light source for generating a control signal which varies as a function of the intensity of light impinging thereon;
   control means for applying said control signal to said variable signal generator to control the operation thereof; and
   AC coupling means connected in parallel with said light dependent control signal generator for coupling fast components of said error signal to said control means for application to said variable signal generator.

2. The system of claim 1 wherein said AC component coupling means comprises a capacitor connected between said error signal generating means and said control signal generating means.

3. The system of claim 2 wherein said error signal generating means comprises:
   a reference signal generator for generating a reference signal; and
   signal comparison means for providing an error signal as a function of the difference between the variable signal generator output and said reference signal values.

4. The system of claim 3 wherein said variable signal generator is a variable frequency oscillator and said reference signal generator is an oscillator generating a predetermined reference frequency and wherein said signal comparison means generates an error signal as a function of the difference between said variable frequency oscillator output and said reference frequency.

5. The system of claim 3 wherein said variable light generating means comprises:
   a light source adapted to provide light emissions the intensity of which varies as a function of the current supplied thereto; and
   current regulating means for regulating the current supplied to said light source as a function of said error signal.

6. The system of claim 1 wherein said variable signal generator has a control terminal for controlling the operation thereof, said control signal generator comprising:
   a photoresistive voltage divider maintained at approximately the potential of said control terminal, said voltage divider including a photoresistive element, said voltage divider providing control signals as a function of the light intensity impinging upon said photoresistive element, said control signals serving to selectively increase or decrease the potential of said control terminal.

7. A system for controlling the oscillating frequency of a voltage controlled oscillator, said system comprising:
   means for generating an error signal which varies as a function of the difference between the instantaneous output value of said oscillator and a reference output value;
   a light source adapted to provide light emissions the intensity of which varies as a function of the current supplied thereto;
   regulator means for varying the current supplied to said light source as a function of said error signal;
   a light dependent control signal generator disposed in optical communication with said light source for providing a control voltage which varies as a function of the intensity of light impinging thereon;
   means for applying said control voltage to the control electrode of said voltage controlled oscillator for controlling the oscillating frequency thereof; and
   coupling means for applying fast changing components of said error signal to said control electrode.